Patented Feb. 22, 1927.

1,618,481

UNITED STATES PATENT OFFICE.

STANLEY D. SHIPLEY AND GUY C. GIVEN, OF STAMFORD, CONNECTICUT, ASSIGNORS TO ATLAS POWDER COMPANY, OF WILMINGTON, DELAWARE, A CORPORATION OF DELAWARE.

LACQUER AND LACQUER ENAMEL.

No Drawing. Application filed April 18, 1925. Serial No. 24,258.

This invention relates to lacquers and lacquer enamels; and it comprises as a new composition a composition containing nitrocellulose, with or without another coating, or film forming substance, such as a resin, and a solvent therefor comprising the methyl ether of ethylene glycol, such solvent advantageously comprising also the ethyl ether of ethylene glycol and comprising "non-solvent" liquids such as benzene; and it further comprises a method of making new and useful coating compositions wherein the solvent powers for nitrocellulose of the methyl ether of ethylene glycol are utilized; all as more fully hereinafter set forth and as claimed.

Nitrocellulose varnishes and lacquers are well known materials; these compositions being solutions of nitrocellulose in one solvent liquid or another. Amyl acetate is quite generally used. It has been found by experience, that the properties of the composition depend very greatly upon the solvent used with the nitrocellulose; i. e. as to strength, luster, free-flowing qualities, adhesion, flexibility, viscosity, etc., etc. Sometime in lacquer work a solution is wanted which does not contain more than say, 5 ounces of nitrocellulose per gallon, to give a film of proper thickness while, in other work, sometimes a very heavy film is wanted. In the latter case solutions containing as high as 20 ounces of nitrocellulose per gallon may be required. In each case, a special viscosity may be wanted. With all nitrocellulose solutions, it is customary to employ more or less of what is called a "non-solvent" as a diluent, this being usually, a hydrocarbon such as benzene, toluene, xylene, gasoline, etc., etc. The function of the non-solvent is, among other things to modify viscosity and to decrease the cost of the finished product.

In a prior Patent No. 1,533,616, issued April 14, 1925, we have described and claimed an improvement in this art, wherein are utilized the advantageous properties of ethyl glycol; an ethyl ether of ethylene glycol. This body has a vapor tension adapting it for use in many relations in the varnish and lacquer art, combined with excellent solvent qualities for nitrocellulose. The nitrocellulose solutions formed with its aid withstand much dilution with non-solvents; it being practicable in some cases to make satisfactory compositions with solvent mixtures containing as high as 3 parts of benzene to 2 parts of ethyl glycol. With the aid of ethyl glycol, enamels and lacquers having a wide variety of uses, may be produced; it being practicable to use with the ethyl glycol, any of the ordinary solvents for nitrocellulose solutions, as well as the ordinary non-solvents. And the solutions so produced, can be blended with various resins or resin compositions used for coating purposes. It is also possible to use the ordinary latent solvents such as camphor, tricresylphosphates, etc.

We have found that for many purposes, it is advantageous to modify the properties of the ethyl glycol in these compositions by admixture of the mono-methyl ether of ethylene glycol. The mono-methyl ether which in itself is an excellent solvent having many characteristic properties that render it useful in this art, in such admixtures, modifies the properties of the ethyl glycol advantageously for many technical purposes. The methyl ether is considerably more volatile, and the compositions therefore, dry quicker. This is sometimes quite advantageous. By suitable admixtures of the mono-methyl ether and the ethyl ether adjusted, drying properties may be secured. For the same amount of dissolved nitrocellulose, the solution in the methyl ether is less viscous and freer flowing than that in the ethyl ether. By mixing methyl glycol and ethyl glycol, gradated flowability may be secured.

Mixtures of the methyl ether and the ethyl ether may be made in widely varying proportions; the most desirable proportion in each case depending upon circumstances. However, as a general rule, a mixture of about equal parts is the most useful.

The methyl ether is in itself a highly desirable solvent for nitrocellulose, being able to dissolve some grades of nitrated cellulose and other nitrated carbohydrates, which are insoluble in the ordinary solvents. It is also a solvent for cellulose acetate. Its solvent power for the ordinary grades of nitrocellulose is markedly greater than that of the ethyl ether. The solutions of nitrocellulose in the methyl ether, as stated, are somewhat less viscous, for the same content than those in ethyl ether; which is sometimes advantageous as giving a more flowable composition. The vapor tension of the methyl ether is considerably greater than that of the ethyl ether, and these solutions are therefore quicker drying. The methyl ether is also an excellent solvent for a wide variety of resins, natural and artificial, such as gum-kauri, ester gum, etc. These resins in solution in methyl ether give smooth, lustrous, high grade films; and the methyl ether is therefore, particularly advantageous in making varnishes and lacquers therewith. The methyl ether is miscible or compatible with most of the vegetable oils, including the drying oils, such as linseed oil; a fact which renders possible advantageous embodiments of our invention, wherein such oils are used in connection with compound varnishes containing resins, or containing resins and nitrocellulose. Exceptionally useful primers or undercoatings for wood, etc., can be made, utilizing the oil solvent properties of methyl ether.

The methyl ether used per se, that is, as the sole solvent liquid for nitrocellulose, gives solutions having many distinctive properties, and makes possible the production of many useful lacquers and enamels. Lacquers of unusual and attractive appearance can be made with nitrocellulose dissolved in the methyl ether, with or without diluent non-solvents, by adding various freely crystallizing organic bodies, such as salicylic acid, naphthalene, etc., for which the ether has high solvent properties. When the lacquer dries, these bodies crystallize within it, giving a "crystallizing" finish.

As an example of our invention utilizing the useful properties of the methyl ether in admixture with the ethyl ether, may be given a lacquer made by dissolving 1 part of nitrocellulose in 7 parts of a mixture of solvents containing the two ethers. The mixture may carry 60% of a mixture of benzene, toluene, xylene and gasolene, in such proportions as may be desirable for the particular drying qualities desired. With this may be advantageously admixed, a quarter of its volume of alcohol or alcohols. A mixture of equal parts of denatured ethyl alcohol and commercial butyl alcohol works well. The composition made as described, gives a medium drying varnish, leaving a lustrous, hard film coating of desirable properties. For some purposes, this composition may be advantageously modified by adding a little resin of one kind or another; say, half as much of the resin as of the nitrocellulose. For an oqaque varnish, any ordinary pigment such as zinc oxide, may be ground into the lacquer. An advantageous proportion is 2 parts of zinc oxid for 1 part of nitrocellulose. To give the film further flexibility and certain other properties, a little castor oil or camphor, or both, may be added.

The same composition may be made up using the methyl ether alone, in lieu of a mixture of methyl ether and ethyl ether. The lacquer will be less viscous, using the same proportion of solvents; or the proportion of solvents to the nitrocellulose may be considerably reduced.

One of the great advantages of the methyl ether in varnish compositions, is its freedom from strong or offensive odor. Where an odor in the composition, however, is not objectionable, a composition of the general character of that above described, can include ordinary nitrocellulose solvents, such as amyl acetate, butyl acetate, propyl acetate or ethyl acetate, ethyl lactate, di-ethyl carbonate, etc; the amount of the methyl ether (or of admixed methyl and ethyl ethers) being correspondingly reduced.

While we have more particularly described the advantages flowing from the use of a mixture of ethyl glycol and methyl glycol, yet we have found that similar advantages may be secured by using various other mixtures of ethers of ethylene glycol. For example, ethyl gylcol may be admixed with propyl glycol; this propyl glycol being derived by the substitution of either the isopropyl or the propyl group for one hydrogen of a hydroxyl group of ethylene glycol. In this event, however, the varnish is somewhat slower drying than where the methyl glycol is used. Similarly, glycol ethers containing butyl groups, or amyl groups may be advantageously admixed with ethyl glycol. Methyl glycol itself, may be mixed with the various propyl glycols, the various butyl glycols, and the various amyl glycols.

We regard our invention as covering any composition containing two or more of these glycol ethers.

What we claim is:—

1. A coating composition comprising nitrocellulose, an alkyl ether of ethylene glycol and a freely crystallizing organic body soluble in said alkyl ether of ethylene glycol.

2. A film comprising nitrocellulose, an alkyl ether of ethylene glycol and a freely crystallizing organic body soluble in said alkyl ether of ethylene glycol.

3. A coating composition comprising nitrocellulose, an alkyl ether of ethylene glycol and salicylic acid.

4. A film comprising nitrocellulose, an alkyl ether of ethylene glycol and salicylic acid.

5. A coating composition comprising nitrocellulose, methyl glycol and a freely crystallizing organic body soluble in methyl glycol.

6. A film comprising nitrocellulose, methyl glycol and a freely crystallizing organic body soluble in methyl glycol.

7. A coating composition, comprising nitrocellulose, methyl glycol and salicylic acid.

8. A film comprising nitrocellulose, methyl glycol and salicylic acid.

9. A coating composition comprising methyl glycol, nitrocellulose and a resin soluble in methyl glycol.

10. A film comprising methyl glycol, nitrocellulose and a resin soluble in methyl glycol.

11. A coating composition comprising nitrocellulose, methyl glycol, a resin soluble in methyl glycol and a pigment.

12. A film comprising nitrocellulose, methyl glycol, a resin soluble in methyl glycol and a pigment.

13. A coating composition comprising nitrocellulose, methyl glycol, a resin soluble in methyl glycol and a freely crystallizing organic body soluble in methyl glycol.

14. A film comprising nitrocellulose, methyl glycol, a resin soluble in methyl glycol and a freely crystallizing organic body soluble in methyl glycol.

15. A coating composition comprising nitrocellulose, methyl glycol, a pigment and a freely crystallizing body soluble in methyl glycol.

16. A film comprising nitrocellulose, methyl glycol, a pigment and a freely crystallizing body soluble in methyl glycol.

17. A coating composition comprising nitrocellulose, methyl glycol, a resin soluble in methyl glycol, a pigment and a freely crystallizing organic body soluble in methyl glycol.

18. A coating composition comprising nitrocellulose, methyl glycol and a drying oil.

In testimony whereof, we have hereunto affixed our signatures.

STANLEY D. SHIPLEY.
GUY C. GIVEN.